UNITED STATES PATENT OFFICE 2,296,933

WATER-DISPERSIBLE LECITHIN

Stroud Jordan, Brooklyn, N. Y.

No Drawing. Application August 25, 1939,
Serial No. 291,897

5 Claims. (Cl. 252—316)

Commercial lecithin as an article of commerce contains from 20 to 40% of an oil or fat. lecithin is usually dissolved in a fat in order that it may be readily dispersible in a mixture of an oleaginous or fatty material with an insoluble granular material. A mixture of oleaginous material and granular material is cocoa-butter and sugar, shortening and flour and the like. The addition of lecithin to these mixtures tends to reduce the viscosity to a large degree and thus effects a better and more intimate mixture of the constituents.

The usual oil or fat solution of lecithin is practically insoluble in water and it is quite difficult to get the lecithin dispersed in water in the form of a good or permanent emulsion. In the confectionery and pastry arts it is quite common to make a water emulsion of lecithin by heating a mixture of water and lecithin to a temperature of from 170° to 185° C. for a considerable period of time in order to make an emulsion so that the emulsion will facilitate the mixing of the shortening or fatty materials with the granular materials such as sugar, flour and the like. The difficulty with which the fat solution of lecithin is brought into an emulsion makes the process quite slow and furthermore it requires comparatively high temperatures to get the emulsion and such high temperatures are not always desirable in the pastry and confectionery arts.

Lecithin is used quite extensively in the preparation of food products, chocolate coatings, bread, shortenings and the like. The lecithin is soluble in the fats or oils which are used in the above food products and has the distinct function of modifying the viscosity of the mixture. It is important therefore that the lecithin should be edible and non-toxic when used with food products.

I have discovered that lecithin may be readily dispersed in water to form stable and substantially permanent emulsions. To accomplish this the lecithin is dissolved in ethyl lactate solution. The ethyl actate solution is placed in a stable emulsion with water as the continuous phase. The amount of ethyl lactate solution which may be used with the lecithin varies from ten to fifty percent by weight of the lecithin. The mixture of thirty to fifty percent of ethyl lactate with lecithin produces a creamy or paste-like mass which can be readily dispersed in water. The amount of ethyl lactate used depends upon the use for which it is to be applied and preferably about forty percent of ethyl lactate by weight of the lecithin gives the proper lecithin-ethyl lactate solution.

The ethyl lactate is readily soluble in lecithin and is soluble in all proportions in water. The ethyl lactate is also quite readily soluble in most fats and practically all of the animal and vegetable oils. Furthermore the ethyl lactate is soluble in some petroleum oil distillates.

To prepare the ethyl lactate-lecithin solution the usual oil or fatty material which is associated with lecithin is removed or extracted before the lecithin is dissolved in the ethyl lactate. Preferably the fats are extracted from the lecithin with acetone and the acetone is removed from the lecithin by vacuum distillation or evaporation. The oil or fat-free lecithin is dissolved in from ten to fifty percent by weight of ethyl lactate.

In place of ethyl lactate propylene glycol may be used. The glycol is soluble in lecithin, soluble in all proportions in water, soluble in fats and oils of animal or vegetable origin. Propylene glycol has a boiling point of 189° C. and is particularly advantageous where lecithin is used in the varnish and paint industry and the textile and leather industries and in insecticides. Ethyl lactate is also useful in the above mentioned industries but it is non-toxic whereas propylene glycol is not usually used in the manufacture of food products. The propylene glycol is used in substantially the same proportions in making a lecithin-propylene glycol solution and in preparing a water emulsion of the propylene glycol-lecithin material as when ethyl lactate is used. Both propylene glycol and ethyl lactate solutions of lecithin may be used to advantage in the preparation of insecticides. The lecithin is a contact insecticide and the ethyl lactate and propylene glycol are effective dispersing agents.

Water-dispersible lecithin has many uses in the industrial arts, such as the manufacture of insecticides, the dyeing industry, and the tanning of leather. For such industrial uses the alkyl glycols are best adapted for dispersing the lecithin. In addition to the propylene glycol described above I have discovered that glycols which are sold under the name of "Carbitols" and "Cellosolves" are very effective. Among the "Carbitols" which have been used are "Carbitol," a monomethyl ether of diethylene glycol, diethyl "Carbitol," a diethyl ether of diethylene glycol, butyl "Carbitol," a monobutyl ether of diethylene glycol, and methyl "Carbitol," a monomethyl ether of diethylene glycol.

Among the "Cellosolves" that have been found to be effective are methyl "Cellosolve," monomethyl ether of ethylene glycol; diethyl "Cellosolve," diethyl ether of ethylene glycol; butyl "Cellosolve," monobutyl ether of ethylene glycol and "Cellosolve," monoethyl ether of ethylene glycol.

These glycol ethers are particularly stable compounds and most of them are soluble in all proportions in water and lecithin.

These "Carbitols" and "Cellosolves" are also effective in dispersing and dissolving lecithin from which the oils or fatty materials naturally associated therewith have been extracted or removed as described above.

For dissolving lecithin which is free of oil or fat, 85 to 80% of lecithin is dissolved in 15 to 20% of the "Carbitol" or "Cellosolve." The mixture of "Carbitols" and diethyl "Carbitol" referred to above is also very effective for dispersing fat-free lecithin. Mixtures of the different "Cellosolves" and "Carbitols" have been found to be effective but it has been found, however, that all of these individual glycols and different mixtures of the glycols have different dissolving effects and different dispersing effects. With all of the "Carbitols" and "Cellosolves" and the mixtures thereof the lecithin constitutes about 80 to 85% by weight of the compound.

The glycol solution of lecithin which is a water-dispersible lecithin has uses other than that referred to above in that it makes a good emulsifying agent for emulsifying oil in water emulsions. It can also be used to advantage for dispersing finely divided solids in aqueous solutions, for example .5% by weight of water-dispersible lecithin added to 95.5% of water will disperse such materials as titanium dioxide and zinc oxide which are ordinarily very difficult to disperse.

This application is a continuation-in-part of my application Serial No. 142,621 filed May 14, 1937 for Water-dispersible lecithin issued March 19, 1940, as Patent No. 2,193,873.

The preferred form of the invention having been thus described, what is claimed as new is:

1. A water-dispersible lecithin comprising commercial lecithin free of oil or fatty material dissolved in an alkyl ether of diethylene glycol.

2. A water-dispersible lecithin comprising commercial lecithin free of oil or fatty material dissolved in twenty to twenty-five percent by weight of the lecithin in a mixture of 75% monoethyl ether of diethylene glycol and 25% diethyl ether of diethylene glycol.

3. A method of modifying the viscosity of a mixture of oleaginous material with an insoluble granular material comprising treating the mixture with a water emulsion of oil or fat-free lecithin dispersed in a carbitol of the group consisting of monoethyl ether of diethylene glycol, monomethyl ether of diethylene glycol, diethyl ether of diethylene glycol, butyl ether of diethylene glycol, monomethyl ether of ethylene glycol, diethyl ether of ethylene glycol, and butyl ether of ethylene glycol.

4. A method of modifying the viscosity of a mixture of oleaginous material with an insoluble granular material comprising treating the mixture with a water emulsion of lecithin dispersed in from twenty to twenty-five percent by weight of the commercial fat-free lecithin dispersed in a carbitol of the group consisting of monoethyl ether of diethylene glycol, monomethyl ether of diethylene glycol, diethyl ether of diethylene glycol, butyl ether of diethyelene glycol, monomethyl ether of ethylene glycol, diethyl ether of ethylene glycol, and butyl ether of ethylene glycol.

5. A water-dispersible lecithin comprising lecithin free of oil or fatty material dissolved in a glycol of the group consisting of propylene glycol, monoethyl ether of diethylene glycol, monomethyl ether of diethylene glycol, diethyl ether of diethylene glycol, butyl ether of diethylene glycol, monomethyl ether of diethylene glycol, monomethyl ether of ethylene glycol, diethyl ether of ethylene glycol and butyl ether of ethylene glycol.

STROUD JORDAN.